(12) United States Patent
Bunker

(10) Patent No.: US 6,174,133 B1
(45) Date of Patent: Jan. 16, 2001

(54) COOLABLE AIRFOIL

(75) Inventor: Ronald Scott Bunker, Niskayuna, NY (US)

(73) Assignee: General Electric Company, Schenectady, NY (US)

(*) Notice: Under 35 U.S.C. 154(b), the term of this patent shall be extended for 0 days.

(21) Appl. No.: 09/235,913

(22) Filed: Jan. 25, 1999

(51) Int. Cl.$^7$ .................................................. F01D 5/18
(52) U.S. Cl. ..................... 416/97 R; 416/1; 416/96 R; 415/115
(58) Field of Search .................... 416/1, 97 R, 97 A, 416/95, 96 R, 96 A; 415/115, 114

(56) References Cited

U.S. PATENT DOCUMENTS

| | | | | |
|---|---|---|---|---|
| 4,259,037 | * | 3/1981 | Anderson | 416/96 R |
| 4,312,625 | * | 1/1982 | Pinaire | 416/96 R |
| 5,165,852 | * | 11/1992 | Lee et al. | 416/97 R |
| 5,328,331 | | 7/1994 | Bunker et al. | 416/96 R |
| 5,484,258 | * | 1/1996 | Isburgh et al. | 416/97 R |
| 5,611,197 | | 3/1997 | Bunker | 60/39.75 |

OTHER PUBLICATIONS

James C. Corman et al., "Power Systems for the 21st Century "H" Gas Turbine Combined Cycles".
B. Lakshminarayana, "Fluid Dynamics and Heat Transfer of Turbomachinery," Penn State Univ., University Park, PA, John Wiley & Sons, Inc., pp. 632–639, 1996.

Joseph L. Mallardi, "From Teeth to Jet Engines," Howmet Corp., Greenwich, CT, 1992.

GEAE Technical Book, entitled, "Jet Engines & Propulsion Systems for Engineers," edited by T. W. Fowler, 1989., pp. 5–38 & 5–40.

* cited by examiner

Primary Examiner—Edward K. Look
Assistant Examiner—Richard Woo
(74) Attorney, Agent, or Firm—Patrick K. Patnode; Marvin Snyder

(57) ABSTRACT

Apparatus and method including a coolable airfoil for exposure in a hot fluid flow of a machine portion. The airfoil is configured to be connectable with the machine portion and includes a peripheral portion surrounding a medial portion, and a chordwise extending pressure side joined with a chordwise extending suction side. At least a first channel is disposed in the peripheral portion of the pressure side and at least a second channel is disposed in the peripheral portion of the suction side. A flow path is formed from the machine portion and through the first and second channels. The flow path is configured to direct a coolant fluid substantially radially outward through the first channel in the peripheral portion of the pressure side and substantially radially inward through the second channel in the peripheral portion of the suction side to cool the airfoil.

19 Claims, 6 Drawing Sheets

COOLABLE AIRFOIL

BACKGROUND OF THE INVENTION

This invention relates, generally, to airfoils and, more particularly, to a coolable airfoil blade of a machine.

Airfoils may be employed in various machines, for example, power turbines, compressors or aircraft engines. Vanes and blades are examples of airfoils. A blade, which blade may also be referred to as a "bucket" or "rotor," may comprise an airfoil mounted to a wheel, disk or rotor, for rotation about a shaft. In addition, a vane, which vane may be referred to as a "nozzle" or "stator," may comprise an airfoil mounted in a casing surrounding or covering the shaft about which the blade rotates. Typically, a series of blades are mounted about the wheel at a particular location along the shaft. Furthermore, a series of vanes are typically mounted upstream (relative to a general flow direction) of the series of blades, such as for maximizing efficiency of a fluid, for example gas, flow. Such an arrangement of vanes succeeded by blades may be referred to as a "stage."

A number of stages of vanes and blades may be located in a compressor in order to compress gas, for example air, to be mixed and ignited with fuel, to be delivered to an inlet of a turbine. The turbine may include a number of stages of vanes and blades in order to extract work from the ignited gas and fuel. The fuel may comprise, for example, natural gas or oil. Further, the addition of the fuel to the compressed gas may involve a contribution of energy to the combustive reaction, which may raise the temperature of the gas to, for example, 3000 to 3500 degrees Fahrenheit. The product of this combustive reaction then flows through the turbine.

In order to withstand high temperatures produced by combustion, the airfoils in the turbine need to be cooled. Insufficient cooling results in undue stress on the airfoil and over time this stress leads or contributes to fatigue and failure of the airfoil. For example, existing cooling configurations include air-cooling, open-circuit cooling, closed-circuit cooling and film-cooling, using a cooling fluid from the compressor or an external source. These configurations, however, do not always enable effective cooling of the airfoil to increase engine efficiency. Accordingly, a need exists in the art for better or improved cooling of the airfoil to increase engine efficiency.

SUMMARY OF THE INVENTION

A coolable airfoil for exposure in a hot fluid flow of a machine portion, and process therefor. The airfoil is configured to be connectable with the machine portion and includes a peripheral portion surrounding a medial portion, and a chordwise extending pressure side joined with a chordwise extending suction side. At least a first channel is disposed in the peripheral portion of the pressure side and at least a second channel is disposed in the peripheral portion of the suction side. A flow path is formed from the machine portion and through the first and second channels. The flow path is configured to direct a coolant fluid substantially radially outward through the first channel in the peripheral portion of the pressure side and substantially radially inward through the second channel in the peripheral portion of the suction side to cool the airfoil.

DETAILED DESCRIPTION OF THE PREFERRED EMBODIMENT

Figure 1:
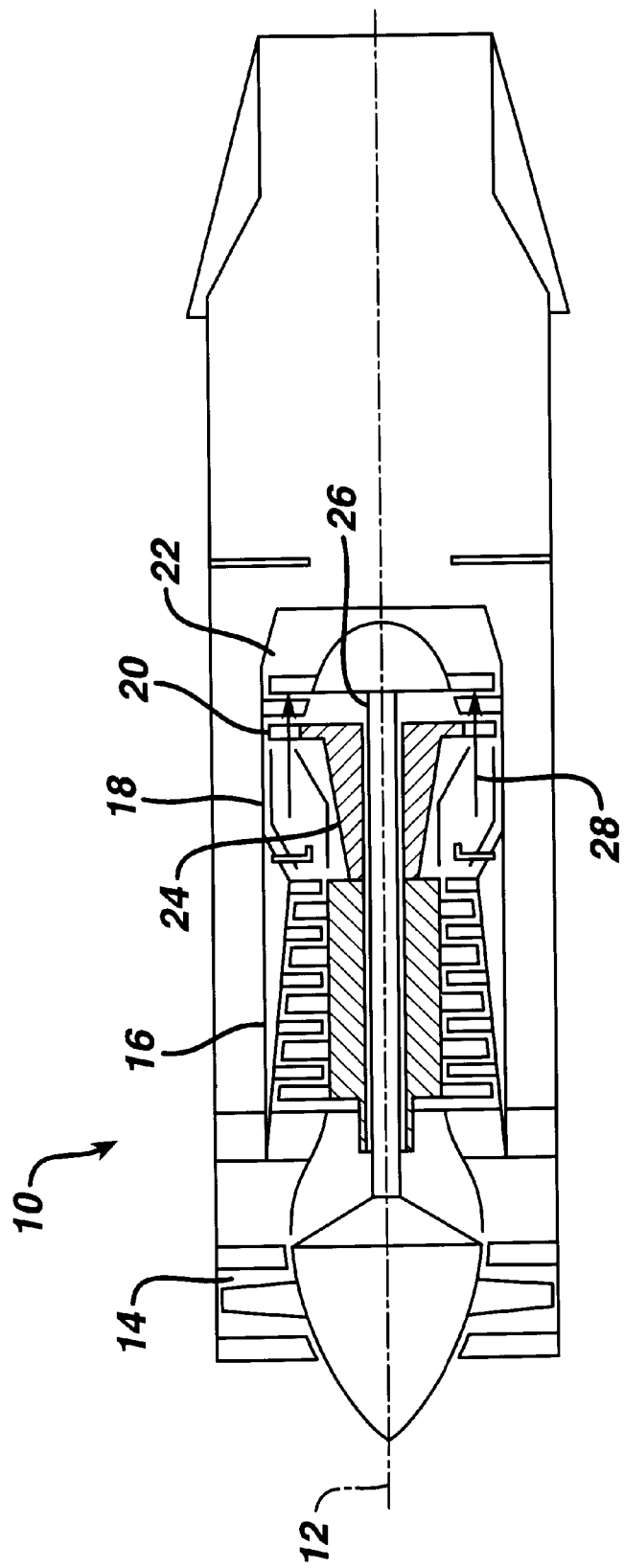
FIG. 1 is a cross-sectional view of a gas turbine engine having fluid cooled turbine blade airfoil assemblies with peripheral cooling channels in accordance with one embodiment of the present invention.

Illustrated in FIG. 1 is a machine 10, for example, a gas turbine engine circumferentially disposed about an engine centerline 12. Machine 10 includes, in serial flow relationship, a fan section 14, a high pressure compressor 16, a combustion section 18, a high pressure turbine 20 and a low pressure turbine 22. Combustion section 18, high pressure turbine 20 and low pressure turbine 22 are often referred to as the hot section of engine 10. A high pressure rotor shaft 24 connects, in driving relationship, high pressure turbine 20 to high pressure compressor 16. A low pressure rotor shaft 26 drivingly connects low pressure turbine 22 to fan section 14. Fuel is burned in combustion section 18 producing a very hot fluid gas flow 28, for example in the range between about 3000 to about 3500 degrees Fahrenheit, which hot flow 28 is directed through high pressure and low pressure turbines 20, 22, respectively, to power machine 10.

Figure 2:
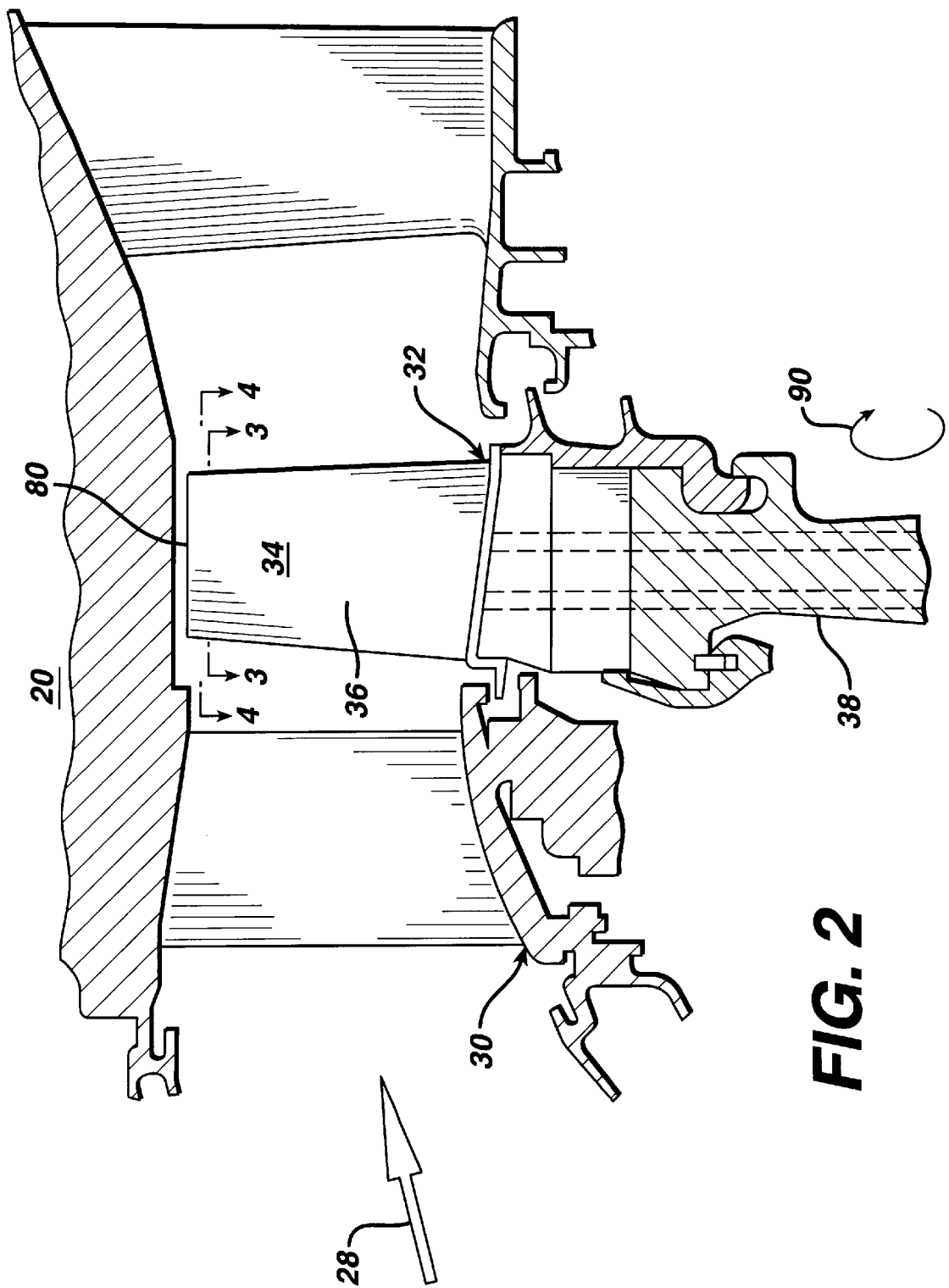
FIG. 2 is an enlarged cross-sectional view of a portion of a turbine illustrating a turbine blade airfoil in FIG. 1.

FIG. 2 more particularly illustrates high pressure turbine 20 having a turbine vane 30 and a turbine blade 32. An airfoil 34 may be used for blade 32, which airfoil 34 is typically located in a portion of compressor 16, a portion of combustion or engine section 18, or a portion of high or low pressure turbines 20 and 22, and typically the later three because of the cooling features of the invention. Blade 32 has an outer wall 36 that is exposed to hot gas flow 28. Turbine blades 32 may be cooled by air routed from fan section 14 or one or more stages of compressor 16 through a blade dovetail 38 of machine 10.

Figure 3:
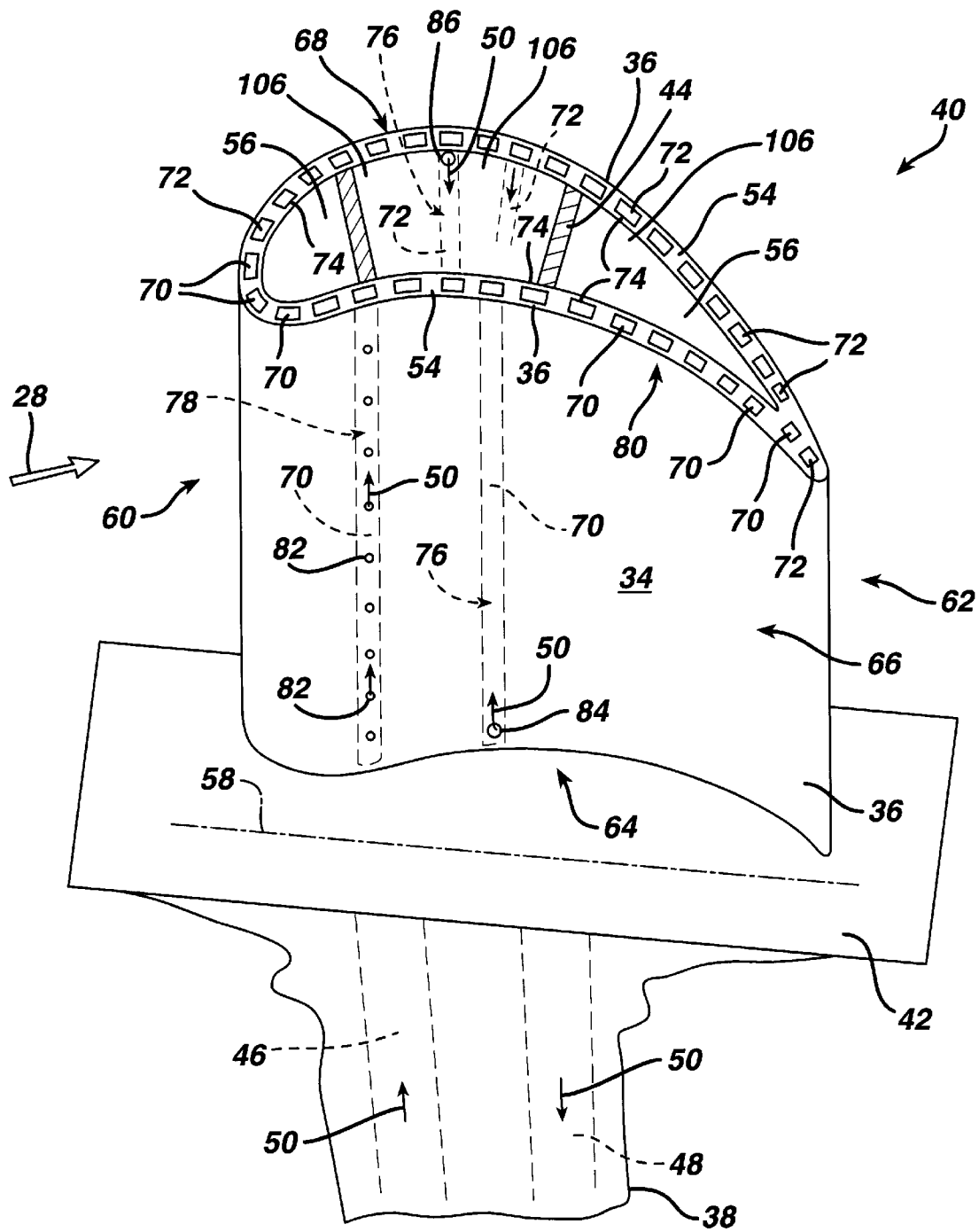
FIG. 3 is an enlarged cross-sectional view of an airfoil, with a closed-circuit configuration, taken through 3—3 in FIG. 2.

FIG. 3 illustrates a coolable airfoil assembly 40 for use and exposure in hot fluid flow 28 of a portion of machine 10 (FIG. 1). Assembly 40 includes a blade platform 42 configured to be connected with blade dovetail 38 of machine 10. When assembled together, blade platform 42 is connected with blade dovetail 38, as will be understood by those skilled in the art. Blade dovetail 38 is connectable with a rotor or wheel (not shown) of machine 10, by conventional means. A cooling conduit (not shown) extends through machine 10 (FIG. 1), or is in communication with machine 10, by conventional means. The cooling conduit typically communicates with platform 42 through dovetail 38 to bring a coolant fluid (for example, air from a conventional off-board source, steam from bottoming cycle of steam processing system, compressor air from earlier stage of machine 10, or the like) via inlet 46 and via outlet 48, to and from respectively, airfoil assembly 40. A closed flow path, generally represented by flow arrows 50, is formed from dovetail 38 through platform 42 and at least a first channel 70 and at least a second channel 72, in which coolant fluid passes to cool airfoil 34. Airfoil 34 is connected with platform 42 and dovetail 38, typically formed or cast integrally. Alternatively, these parts may be formed integrally or separately, and with any desired features or configurations. For instance, dovetail 38, platform 42 and airfoil 34 may be formed separately, and then connected together such as by welding or brazing. Additionally, different parts of assembly 40 may be formed with different (e.g., compatible) materials.

Airfoil 34 includes a peripheral portion 54 surrounding a medial portion 56. Airfoil 34 also includes a generally chordwise 58 extending leading edge section 60 joined with a trailing edge section 62 by a midchord section 64 adjoining each therebetween. Still further, airfoil 34 includes a pressure side 66 joined with a suction side 68, both also extending in chordwise direction 58. First channel 70 is disposed in peripheral portion 54 of pressure side 66 and second channel 72 is disposed in peripheral portion 54 of suction side 68, each channel 70 and 72 being in flow communication with the flow path. In one example, first and second channels 70 and 72, respectively, each include a plurality of such channels. Channels 70 and 72 may be straight through convection channels 76 or impingement channels 78. Airfoil 34 with channels 70 and 72 may be formed, typically by employing a technique such as investment casting. An exemplary investment casting process is disclosed in a document entitled "From Teeth to Jet Engines" (authored by Joseph L. Mallardi, copyrighted 1992, and available from Howmet Corporation, Corporate Relations Department, P.O. Box 1960, 475 Steamboat Road, Greenwich, Conn. 06836-1960, U.S.A.).

Still referring to FIG. 3, in one aspect of the invention channels 70 and 72 are configured to attain a desired cooling capacity corresponding to their particular peripheral portion 54 location. For example, the external heat load varies around the periphery of airfoil 34. Similarly, leading and trailing edge sections 60 and 62, respectively, tend to have higher heat loads since they have less surface area over which to spread the heat load from hot fluid flow 28. Thus, typically, the flow path formed from machine 10 (FIG. 1) and through first and second channels 70 and 72 is configured to direct the coolant fluid substantially radially outward through first channel 70 in pressure side 66 and substantially radially inward through second channel 72 in suction side 68 to cool the airfoil. Further, this flow path configuration is particularly advantageous because it utilizes Coriolis cooling effects. That is, since blade 32 is subject to rotation, for example, with dovetail 38 during use in rotational direction 90 (FIG. 2), blade 32 can utilize Coriolis cooling effects when the coolant fluid is directed through the flow path. For example, when the coolant fluid flows radially outward the coolant tends to cool outer wall 36 in peripheral portion 54 of pressure side 66 more than inner wall 74 of channels 70. Conversely, when the coolant fluid flows radially inward the coolant tends to cool outer wall 36 in peripheral portion 54 of suction side 68 more than inner wall 74 of channels 72.

In another embodiment, channels 70 and 72 may be configured to enable a high velocity flow of the coolant fluid to flow therethrough, as illustrated. Utilizing the high velocity flow, for example, compressible fluid flowing at a rate of about 50 meters per second to about 250 meters per second and preferably greater than about 100 meters per second, enables more effective cooling of the airfoil assembly. Alternatively, a conventional incompressible fluid flowing at a rate less than about 100 meters per second could also be employed. Channels 70 and 72 may be configured to reduce a pressure stress or ballooning, exerted by the coolant fluid onto walls of channels 70 and 72 by utilizing the geometric configurations illustrated in the exemplary embodiments. Channels 70 and 72 may have a length greater than a width to compensate for the pressure forces exerted by the coolant fluid onto the walls of channels 70 and 72. Alternatively, channels 70 and 72 may have a volume, represented by cross-sectional flow area, to compensate for the pressure forces exerted by the coolant fluid onto the walls of channels 70 and 72.

Medial portion 56 of airfoil 34 may be solid (FIG. 7) or have at least one hollow 106 therein (FIG. 3). If medial portion 106 has at least one hollow 106, medial portion 106 typically has at least one structural stiffener 44 connected with and between pressure side 66 and suction side 68 of peripheral portion 54, by conventional means, to maintain hollow 106. Stiffener 44 may be a pin, as would be known by one of ordinary skill in the art, or a wall extending from a tip portion 80 to platform 42 and forming one or more separate hollows 106. With hollows 106, the flow path may direct coolant fluid from inlet 46, through platform 42 and into hollows 106 or directly into convection type 76 channels 70, typically via hole 84 in platform 42. Coolant fluid directed into hollows 106 may be directed into impingement type 78 channels 70, through jets 82, typically holes formed in inner wall 74 to communicate the coolant fluid from hollows 106 to channels 78 and impinge upon outer wall 36 thereby aiding in cooling outer wall 36. The coolant fluid in hollows 106 may be directed into suction side hole 86 and then through channels 72. Hole 84 may be located in inner wall 74 of channel 70 and communicate coolant fluid to channels 70 similar to that for channels 72, where coolant fluid is then directed through channels 70. The impingement type 78 channel 70 may be located in the suction side 68 peripheral wall 54 (not shown). The orientation, number and size of jets 82 could be random or calculated based on desired cooling effects. With either convection type 76 channels 70 or 72 and impingement type 78 channels 70 or 72, once coolant fluid enters the respective channels 70 and 72, the coolant fluid is directed in the desired direction for completing the flow path for cooling the airfoil, for example, radially outward through pressure side 66 and radially inward through suction side 68.

Figure 4:
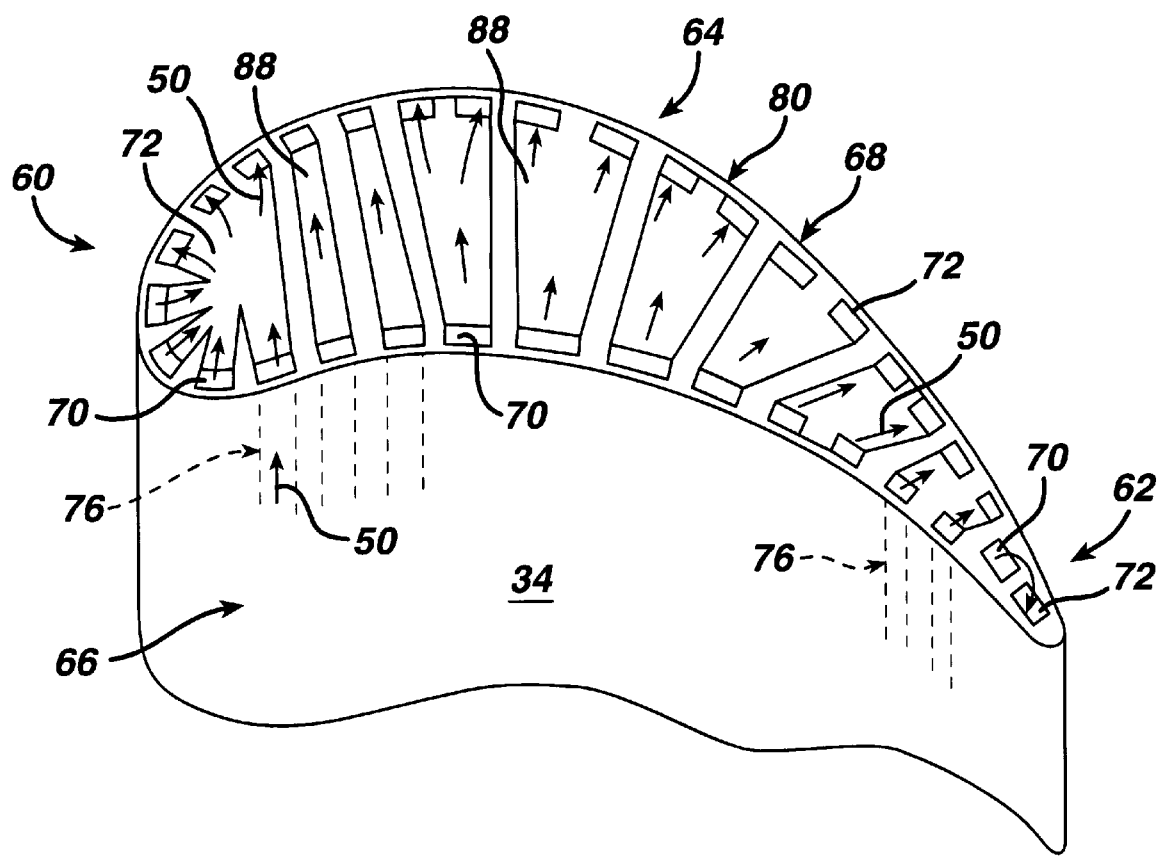
FIG. 4 is an enlarged cross-sectional view of a tip portion of the airfoil of FIG. 3 taken through 4—4 in FIG. 2.

FIG. 4 illustrates tip portion 80 having at least one tip channel 88, typically a plurality of channels 88. Tip channels 88 may be flow connected with and between one or more channel 70 in pressure side 66 and one or more channel 72 in suction side 68, for example, at least a one to one correspondence (i.e., pressure side to suction side) to direct coolant fluid in the flow path between these channels 70 and 72 via tip channels 88. Multiple channels 70 and 72 may be in flow communication with each other and tip channels 88, depending on their location relative to leading edge section 60, midchord section 64 and trailing edge section 62, as well as depending on their location in pressure side 66 and suction side 68. The ultimate configuration of channels 70 and 72 will vary depending on the heat load relief desired at a particular location. In another embodiment, FIG. 4 illustrates a closed-circuit configuration for the flow path through airfoil 34 from platform 42 (FIG. 3) to first channels 70 to tip channels 88 to second channels 72 and then back to platform 42 (FIG. 3).

Figure 6:
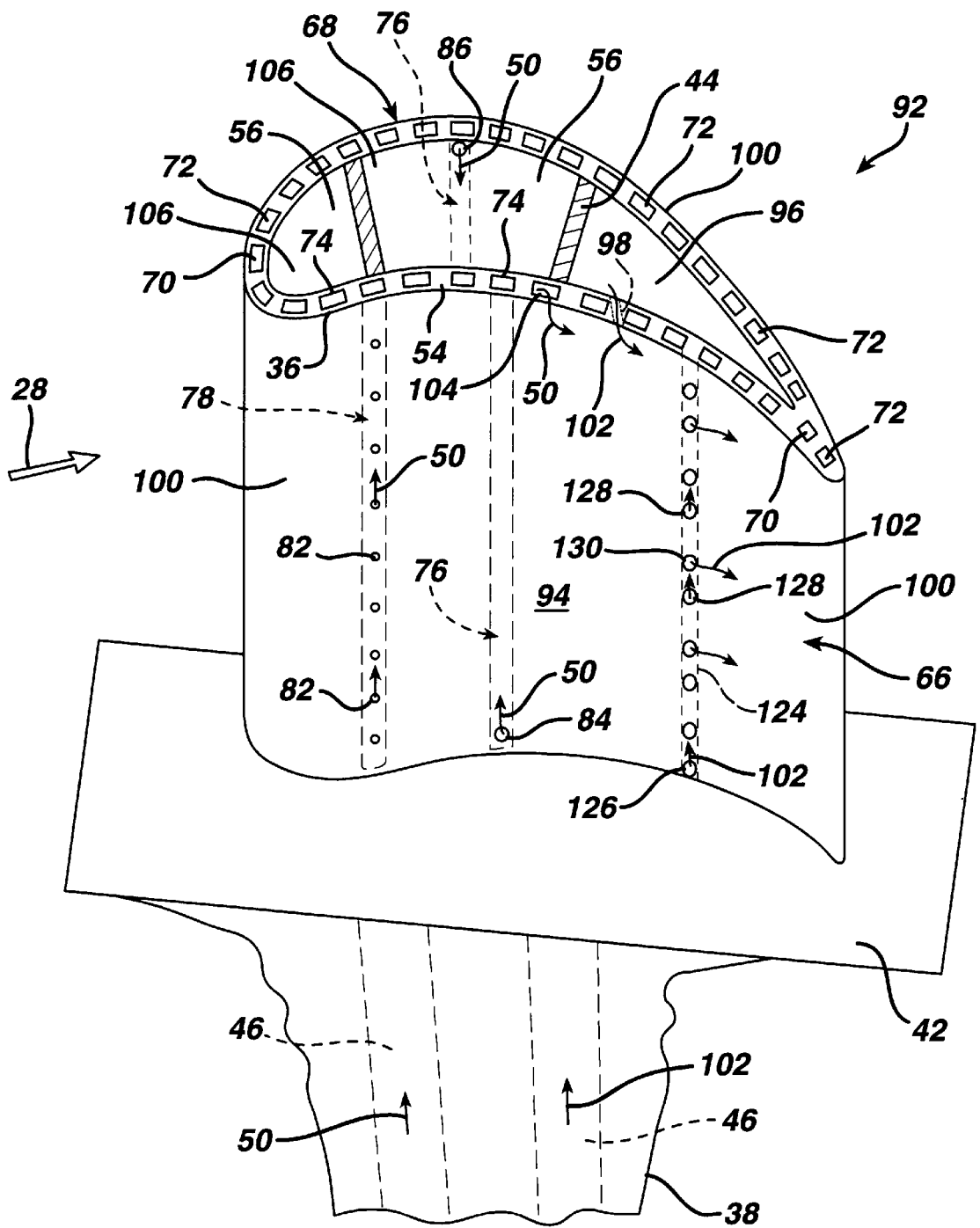
FIG. 6 is a view similar to FIG. 3, but of an alternative embodiment of an airfoil of one embodiment of the present invention, with an open-circuit configuration.

FIG. 6 illustrates another embodiment of an airfoil assembly 92 including an airfoil 94 of one embodiment of the present invention. Airfoil assembly 92 and airfoil 94 are generally similar to airfoil assembly 40 (FIG. 3) and airfoil 34 (FIG. 3), except as provided hereafter. Similar components are similarly identified and defined as those of airfoil assembly 40 and airfoil 34. For example, airfoil assembly 92 has an open-circuit flow path configuration, though still utilizing the flow path features of directing coolant fluid radially outward through first channels 70 and radially inward through second channels 72. In the open-circuit flow path, coolant fluid is directed into and through airfoil assembly 92 but it does not return to dovetail 38 or the cooling conduit (not shown). For example, coolant fluid may be fed from platform 42 into channels 70 and 72 from one or more inlets 46. Then, the flow path may include at least one opening 104 for communicating the coolant fluid out of channels 70 and 72 (for channels 72 locating opening 104 (not shown) near platform 42 rather than tip portion 80), typically over an outer surface 100 of peripheral portion 54 as a film or otherwise.

Still referring to FIG. 6, airfoil 94 may have at least one separate hollow 96 where assembly 92 is configured to receive a second coolant fluid, or have a second flow path, isolated from the first coolant fluid or flow path. For example, airfoil 94 may include at least one opening 98 through peripheral portion 54 for communicating the second coolant fluid out of hollow 96, typically over outer surface 100 of peripheral portion 54 as a film or otherwise. Second coolant fluid flowing through the second flow path is represented by flow arrows 102. Peripheral portion 54 may include at least one channel 124 in flow communication with the second flow path. Channel 124, typically multiple channels 124 (not shown), could be convection channels having an opening 126 located in platform 42 and in direct flow communication with inlet 46 or located in inner wall 74 and in flow communication with hollow 96, either way being similar to previously described convection channels 76 (FIG. 3). Channels 124 could be impingement channels having jets 128 in inner wall 74 and in flow communication with hollow 96, similar to previously described impingement channels 78 (FIG. 3). Channels 124 may include openings 130 for communicating the second coolant fluid out of channels 124, typically over outer surface 100 of peripheral portion 54 as a film or otherwise. Channels 70 and 72 may also be configured similar to channels 124 for communicating the first coolant fluid into, through and out of airfoil 94. If there are multiple hollows 106 and 96, like hollows may be flow connected (not shown) by conventional means, while still maintaining the separateness of the first and second flow paths.

Figure 7:
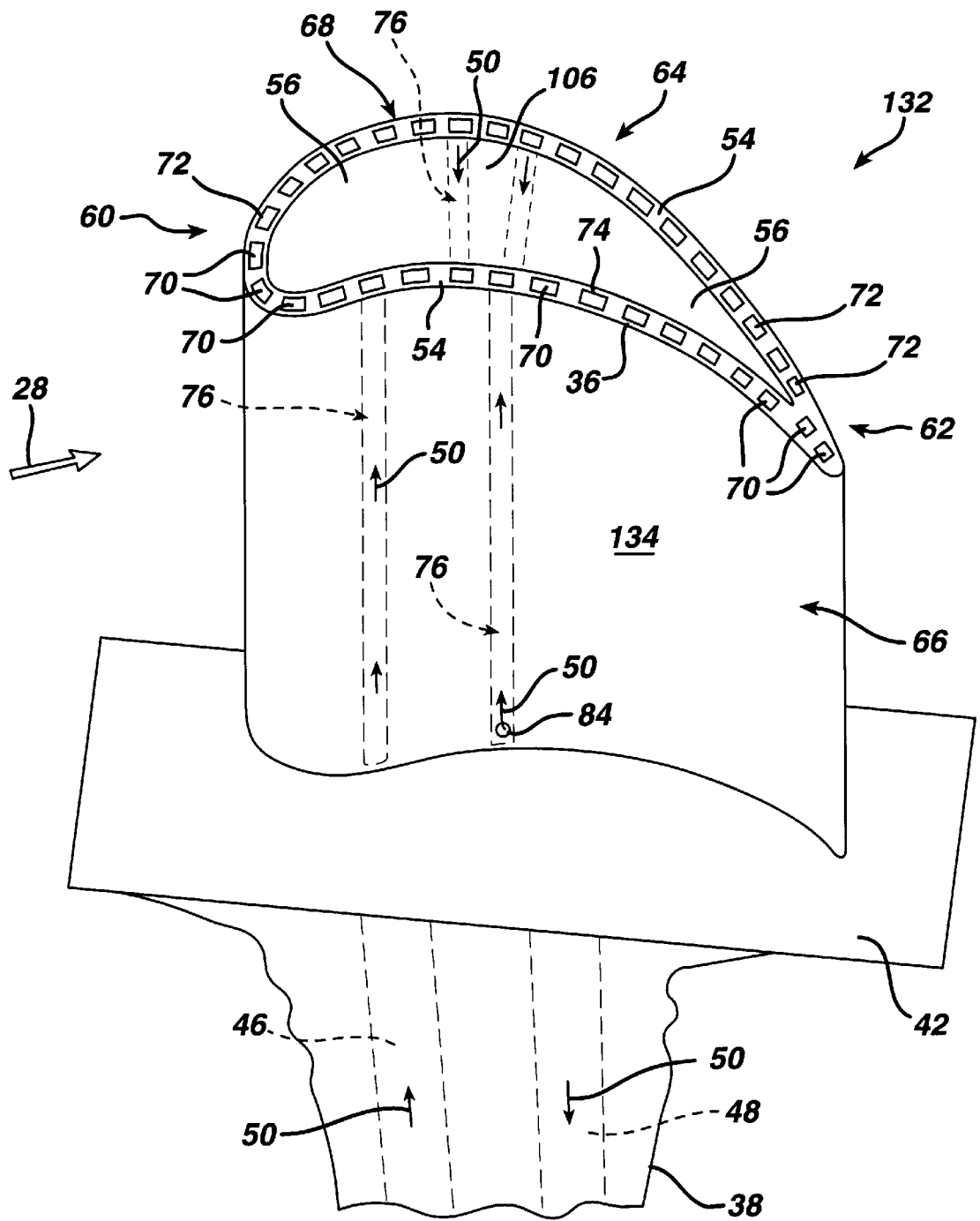
FIG. 7 is a view similar to FIG. 3, but of an alternative embodiment of an airfoil of one embodiment of the present invention, with another closed-circuit configuration.

FIG. 7 illustrates another embodiment of an airfoil assembly 132 including an airfoil 134 of the present invention. Airfoil assembly 132 and airfoil 134 are generally similar to airfoil assembly 40 and airfoil 34, except as provided hereafter. In this regard, similar components are similarly identified and defined as those of airfoil assembly 40 and airfoil 34. For example, airfoil 134 has a solid medial portion 56.

In another embodiment, the invention includes a process for cooling an airfoil, for example airfoil 34 of airfoil assembly 40 (FIGS. 3 and 4). The process may first include locating airfoil 34 in a portion of machine 10 (FIG. 1), for example, airfoil assembly 40 as discussed above. Next, airfoil 34 is exposed to hot fluid flow 28 in machine 10 (FIG. 1). The flow of coolant fluid can then be circulated through the flow path from the conduit (not shown) and entering airfoil assembly 40 through inlet 46 of dovetail 38 adjacent to platform 42, flowing radially outward through pressure side 66 in first channels 70, flowing through tip channels 88 (FIG. 4), flowing radially inward through suction side 68 in second channels 72, flowing back through platform 42 and then through adjacent outlet 48 of dovetail 38 and to the conduit (not shown) in machine 10 (FIG. 1).

Figure 5:
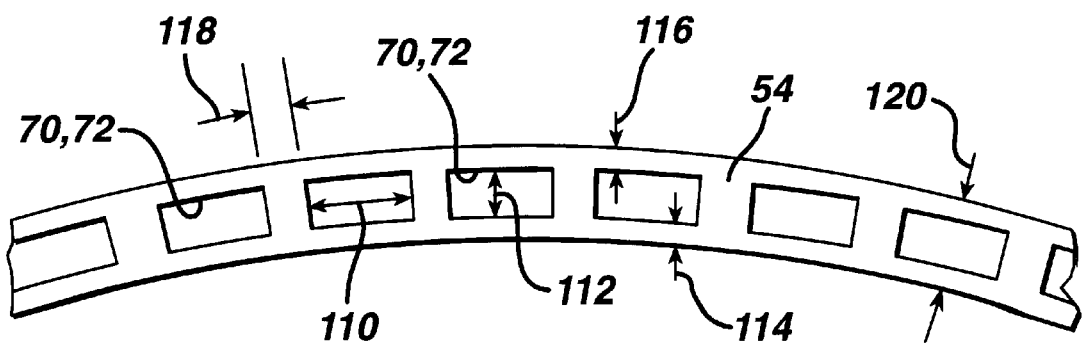
FIG. 5 is an enlarged cross-sectional view of a peripheral portion of the airfoil in FIG. 3.

Utilizing one or more of the embodiments disclosed herein, it is further possible that the effects of thermal stress due to exposure of outer walls 36 of airfoils 34 (FIG. 3), 94 (FIG. 6) and 134 (FIG. 7) in hot fluid flow 28 are reduced. Further, for example, although various dimensions may be possible, FIG. 5 illustrates a range of exemplary dimensions for a portion of outer wall 36 of airfoil 34 illustrated in FIG. 3. By analogy, similar dimensions may be applied to outer walls 36 of airfoils 94 (FIG. 6) and 134 (FIG. 7). In FIG. 5, channels 70 and 72 may have a length 110 in the range between about 1.5 mm to about 15 mm, a width 112 in the range between about 0.5 mm to about 5 mm, an inside thickness 114 in the range between about 0.5 mm to about 4 mm, and outside thickness 116 in the range between about 0.5 mm to about 2 mm and preferably about 2 mm, a length wall thickness 118 between channels 70, 72 in the range between about 0.2 times length 110 to about length 110, and an overall thickness 120 in the range between about 1.5 mm to about 11 mm. Still further, although not illustrated, channels 70 and 72 and impingement surfaces, such as outer walls 36, may be smooth, rough, textured or turbulated to enhance or control the cooling effects of each, as would be known by one of ordinary skill in the art.

As various possible embodiments may be made in the above invention for use for different purposes and as various changes might be made in the embodiments above set forth, it is understood that all matters here set forth or shown in the accompanying drawings are to be interpreted as illustrative and not in a limiting sense. While only certain features of the invention have been illustrated and described, many modifications and changes will occur to those skilled in the art. It is therefore to be understood that the appended claims are intended to cover all such modifications and changes as fall within the true spirit of the invention.

What is claimed is:

1. A coolable airfoil for exposure in a hot fluid flow of a machine portion, comprising:

said airfoil being configured to be connectable with said machine portion, said airfoil including a peripheral portion surrounding a medial portion, and a chordwise extending pressure side joined with a chordwise extending suction side, wherein said medial portion extends circumferentially from said peripheral portion adjacent said pressure side to said peripheral portion adjacent said suction side;

at least a first channel disposed in said peripheral portion of said pressure side and at least a second channel disposed in said peripheral portion of said suction side; and a flow path formed from said machine portion and through said first and second channels in which said flow path is configured to direct a coolant fluid substantially radially outward through said first channel in said peripheral portion of said pressure side and substantially radially inward through said second channel in said peripheral portion of said suction side to cool said airfoil.

2. The airfoil of claim 1, wherein said at least first channel includes a plurality of first channels and said at least second channel includes a plurality of second channels.

3. The airfoil of claim 1, in which said first and second channels are selected from the group of convection channels and impingement channels configured to cool said peripheral portion.

4. The airfoil of claim 1, in which said flow path comprises a closed-circuit flow path configured to direct coolant fluid there through.

5. The airfoil of claim 1, in which said peripheral portion has openings in communication with at least one of said first and second channels and said flow path is configured to direct said coolant fluid through said openings and over an outer surface of said peripheral portion.

6. The airfoil of claim 1, in which said airfoil includes a tip portion joined with and between said pressure side and said suction side, said tip portion including at least one tip channel in flow communication with at least said first channel and at least said second channel.

7. The airfoil of claim 6, in which said flow path is configured to direct said flow of fluid to said first channel and then to said second channel.

8. The airfoil of claim 1, in which said airfoil includes at least one hollow in said medial portion.

9. The airfoil of claim 8, in which said hollow is configured to receive said coolant fluid from said machine portion and to communicate said coolant fluid to at least one of said first and second channels.

10. The airfoil of claim 8, in which said hollow is configured to receive a second coolant fluid from said machine portion and in which said airfoil includes an opening isolated from said flow path and in flow communication with said hollow for communicating said second coolant fluid out of said hollow.

11. The airfoil of claim 1, in which said airfoil comprises an airfoil assembly, said airfoil assembly including a platform connected with said airfoil, said platform connected with a dovetail and said dovetail being configured to be connectable with said machine portion.

12. The airfoil of claim 1, in which said airfoil is connected with said machine portion and said machine portion comprises at least one of a turbine portion, an engine portion, and a compressor portion.

13. The airfoil of claim 1, in which said first and second channels are configured to reduce a pressure stress from said coolant fluid onto walls of said first and second channels.

14. The airfoil of claim 1, in which said channels are configured to enable a high velocity flow of said coolant fluid to flow there through.

15. The airfoil of claim 1, in which said airfoil has an outer wall configured to reduce a thermal stress thereof.

16. A process for cooling an airfoil, comprising:
   locating an airfoil in a machine portion, said airfoil including a peripheral portion surrounding a medial portion, and a chordwise extending pressure side joined with a chordwise extending suction side, wherein said medial portion extends circumferentially from said peripheral portion adjacent said pressure side to said peripheral portion adjacent said suction side;
   exposing said airfoil to a hot fluid flow in said machine portion;
   circulating a flow of coolant fluid through a flow path formed from said machine portion and through at least a first channel located in said pressure side of said peripheral portion and at least a second channel located in said suction side of said peripheral portion, in which said flow of fluid is directed substantially radially outward through said first channel and substantially radially inward through said second channel to cool said airfoil.

17. The process of claim 16, in which said circulating includes rotating said airfoil relative to said machine portion.

18. The process of claim 17, in which said flow path in said first and second channels is substantially through said peripheral portion.

19. The process of claim 18, in which said airfoil includes a tip portion, said tip portion including at least one tip channel in flow communication with at least said first and at least said second channel and in which said circulating includes circulating said flow of fluid from said machine portion to said first channel then to said tip channel then to said second channel and then back to said machine portion.

* * * * *